United States Patent [19]
Adler et al.

[11] Patent Number: 5,105,900
[45] Date of Patent: Apr. 21, 1992

[54] TRANSFER CASE COLD SHIFT ASSIST

[75] Inventors: Randy W. Adler, Seneca Falls; David Sperduti, Auburn, both of N.Y.

[73] Assignee: New Venture Gear, Inc., Troy, Mich.

[21] Appl. No.: 624,082

[22] Filed: Dec. 7, 1990

[51] Int. Cl.$^5$ .............................................. B60K 23/08
[52] U.S. Cl. ..................................... 180/247; 180/249; 180/250
[58] Field of Search ................ 180/233, 247, 248, 249, 180/250

[56] References Cited

U.S. PATENT DOCUMENTS

| | | | |
|---|---|---|---|
| 2,913,929 | 11/1959 | Anderson | 180/247 |
| 4,341,281 | 7/1982 | Nagy | 180/247 |
| 4,381,828 | 5/1983 | Lunn et al. | 180/247 |
| 4,677,873 | 7/1987 | Eastman et al. | 180/250 |
| 4,770,280 | 9/1988 | Frost | 180/247 |
| 5,033,575 | 6/1991 | Takeshita | 180/249 |

*Primary Examiner*—Mitchell J. Hill
*Attorney, Agent, or Firm*—Harness, Dickey & Pierce

[57] ABSTRACT

The present invention provides a motor vehicle cold shift assist system for selectively and automatically connecting the non-driven wheels to its associated axle drive mechanism under certain operational and temperature conditions for counteracting the inertial loading acting on the transfer case synchronizer clutch mechanism. The present invention substantially reduces the shift resistance encountered upon the vehicle operator subsequently shifting into the four-wheel drive mode during cold weather conditions.

17 Claims, 3 Drawing Sheets

TRANSFER CASE COLD SHIFT ASSIST

BACKGROUND OF THE INVENTION

The present invention relates to a shift arrangement for motor vehicle transmissions and, more particularly, to such an arrangement for reducing operator shift effort when shifting from a two-wheel drive mode to a four-wheel drive mote under cold weather conditions.

In general, power transfer mechanisms are used in association with both manual and automatic transmissions for selectively directing power to the wheels of a motor vehicle upon shifting from the two-wheel drive mode to the four-wheel drive mode. It is known to use a gear synchronizer clutch arrangement in part-time transfer cases to provide "shift-on-the-fly" two-wheel drive to four-wheel drive "mode" shifting. One example of such an arrangement is shown and described in U.S. Pat. No. 4,677,873 issued Jul. 7, 1987 to Eastman which discloses a part-time transfer case having a gear synchronizer clutch unit incorporated as part of its "mode" shifting mechanism. Following speed synchronization, a fork mechanism shifts the synchronizer clutch sleeve into engagement with the external splines of a silent chain carrier for locking the transfer case in its four-wheel drive mode thereby delivering power via the drive chain to the vehicle's front output shaft.

In part-time four-wheel drive systems, various axle disconnect systems have been used for enabling the non-driven wheel(s) to rotate free of the remainder of its associated axle final drive assembly when the vehicle is operating in the two-wheel drive mode. One type of axle disconnect system includes use of manual locking hubs which the operator must unlock to permit the non-driven wheels to rotate free of its associated axle final drive assembly. Conventionally, "shift-on-the-fly" part-time transfer cases utilize automatic locking hubs having manual, electrical or fluid (i.e. vacuum) actuated front axle disconnect systems. These "automatic" systems connect the non-driven wheels to its final drive assembly for transferring drive torque from the transfer case to the non-driven wheels. Typically, connection is accomplished in response to a signal indicating that the vehicle operator has shifted into the four-wheel drive mode.

Prior patents disclose various means for enabling the non-driven wheel(s) to rotate free of the remainder of the front drive mechanism when in two-wheel drive mode. For example, U.S. Pat. No. 2,913,929 (Anderson) discloses a front axle design having complementary mechanism for cooperatively disconnecting both of the front wheels from the drive train to permit two-wheel drive operation. These complimentary mechanisms are actuated in common by a movable lever in the passenger compartment of the vehicle. The movable lever is connected to complementary clutch collars which are shiftable between two-wheel drive and four-wheel drive positions on the right and left axle shafts. Likewise, U.S. Pat. No. 2,770,150 (Culverwell) discloses a front axle design for a four-wheel drive vehicle which includes a mechanism for simultaneously disconnecting the right and left axle shafts from the center differential. In this type of system, disconnection of the front wheels takes place by shifting complementary clutch collars located within the front differential housing. Finally, reference may be had to U.S. Pat. No. 4,381,828 issued May 3, 1983 (Lunn et al) for details of a vacuum actuated axle disconnect system.

A common problem associated with part-time four-wheel drive drivetrains is that, during cold weather conditions, the vehicle operator must physically overcome excessive shift resistance when attempting to shift into the four-wheel drive mode upon starting the vehicle. The increased shift effort is due primarily to the high viscosity of the axle lubricant entrained within the front drive assembly and the inertial loading of the front prop shaft both of which must be overcome by the "mode" shift synchronizer clutch unit. However, this cold weather phenomenon is primarily temperature dependent in that excessive shift resistance is experienced upon attempting to shift into the four-wheel drive mode immediately after cold starting of the vehicle. Once the vehicle has been in operation for a period of time, the temperature of the front drive assembly lubricant increases and its viscosity decreases for restoring normal shifting operation of the synchronizer clutch unit.

SUMMARY OF THE INVENTION

It is therefore an object of the present invention to overcome the disadvantages associated with conventional four-wheel drivetrains by providing a cold shift assist system for substantially reducing the shift resistance encountered upon shifting into the four-wheel drive mode during cold weather conditions.

It is a further object of the present invention to provide a control system for selectively and automatically coupling the non-driven prop shaft for rotation with its associated set of wheels prior to the vehicle operator shifting the transfer case into the four-wheel drive mode for counteracting the inertial loading acting on the synchronizer clutch mechanism.

Accordingly, the present invention permits utilization of a conventional part-time transfer case which is interactively associated with an electronic control unit and sensor system for determining the non-driven axle final drive assembly fluid temperature and the transmission position and generating signals indicative thereof.

More particularly, the electronic cold shift assist system of the present invention utilizes temperature sensing means for measuring the fluid temperature in the non-driven axle differential as well as vehicle speed sensing means for sensing the speed of the vehicle. Signals generated by the temperature sensing means and the vehicle speed sensing means are sent to an electronic control unit for comparison to pre-set limit values. During two-wheel operation, if the non-driven axle fluid temperature is below the pre-set value and the vehicle is in a static or "zero" speed condition, the control unit selectively actuates final drive connecting means for coupling the non-driven prop shaft to be rotatably driven by the non-driven wheels. Thereafter, the vehicle operator can shift into the four-wheel drive mode without experiencing the shift resistance since the inertial loading on the non-driven prop shaft has been negated. The control unit is designed to maintain the interconnection between the non-driven prop shaft and its axle drive assembly until the fluid temperature exceeds the pre-set temperature value. Thereafter, the control unit selectively de-actuates the final drive connecting means for disconnecting the prop shaft from the non-driven wheels.

It is another object of the present invention to provide an electronic control module adapted to process electrical input signals, compare the signals with the stored information, and make controlled decisions in response thereto.

BRIEF DESCRIPTION OF THE DRAWINGS

Further objects, features and advantages of the present invention will be apparent from the following description and accompanying drawings in which.

DETAILED DESCRIPTION OF THE INVENTION

Figure 1:
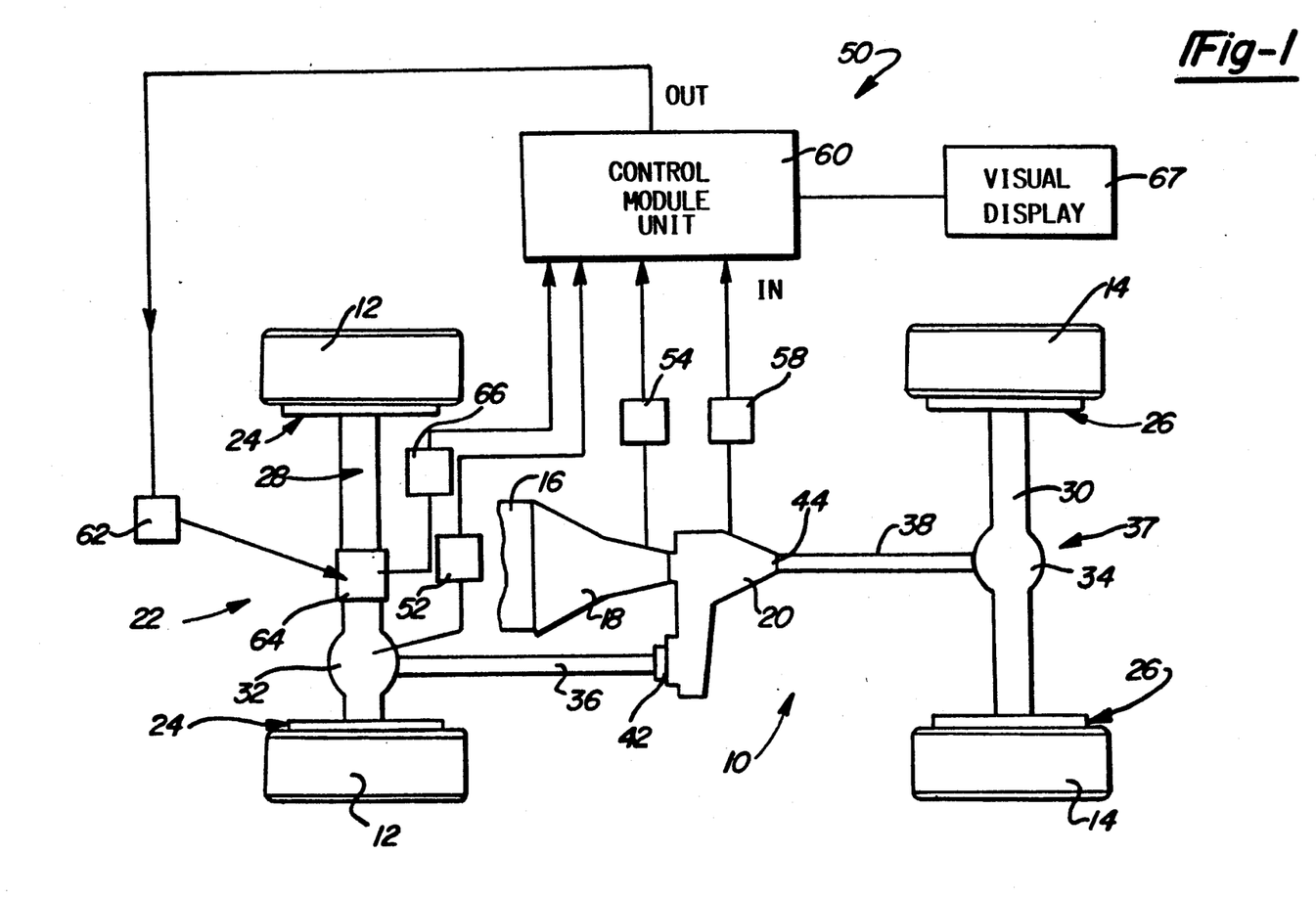
FIG. 1 is a schematic representation of a motor vehicle with a part-time four-wheel drivetrain equipped with the electronic cold shift assist system of the present invention.

Referring to FIG. 1, a vehicle of a type suited for use with the present invention is indicated generally by 10. Vehicle 10 has a pair of front wheels 12 and a pair of rear wheels 14 drivable from a source of power, such as an engine 16, through a transmission 18 which may be of either the manual or automatic type.

In the embodiment shown, vehicle 10 is a rear wheel drive vehicle which incorporates a power transfer means, such as a transfer case 20, for receiving drive torque from transmission 18 for normally driving rear wheels 14 in a two-wheel drive mode of operation. Transfer case 20 also selectively transfers torque to front wheels 12 upon being coupled to a front drive mechanism 22 for defining a four-wheel drive mode of operation. As such, front wheels 12 are selectively driven through the cooperative action of front drive mechanism 22 and transfer case 20. Front and rear wheels 12 and 14 are part of front and rear wheel assemblies 24 and 26, respectively, which, in turn, are connected at opposite ends of front and rear axle assemblies 28 and 30, respectively. Front axle assembly 28 is part of front drive mechanism 22 which also includes a front differential 32 coupled to be driven by front prop shaft 36 when transfer case 20 is operating in the four-wheel drive mode. Rear axle assembly 30 is part of rear drive mechanism 37 which includes a rear differential 34 coupled in driven relationship to rear prop shaft 38 for driving rear wheel assemblies 26. Prop shafts 36 and 38 are connected at their opposite ends to front and rear outputs 42 and 44, respectively, of transfer case 20. A transmission output shaft (not shown) couples transmission 18 to transfer case 20 to supply power thereto.

An exemplary part-time transfer case 20 which could be used with the present invention is shown and described in detail in U.S. Pat. No. 4,770,280 issued Sept. 13, 1988 to Frost, assigned to the assignee of the present invention, the disclosure of which is expressly incorporated by reference herein. It is to be understood however, that most conventional part-time transfer cases could be used without departing from the scope of the present invention. Likewise, it is to be understood that the orientation of the drivetrain on vehicle 10 is merely exemplary in nature and that the drivetrain could be reversed for normally driving the front wheels in the two-wheel drive mode.

In accordance with the teachings of the present invention, an electronic cold shift assist system 50 (hereinafter "ECSA") is provided for substantially reducing the shift resistance encountered by the vehicle operator upon attempting to shift transfer case 20 into its four-wheel drive mode during cold weather condition. In particular, ECSA 50 includes a temperature sensing device, such as a solid state temperature sensor, schematically identified as reference numeral 52, which is provided to measure the temperature of the axle lubricant or fluid confined within front differential 32 and to generate a signal indicative thereof. ECSA 50 further includes means for sensing the motive condition of vehicle 10. More particularly, a park sense switch 54 is applicable for use with an automatic type transmission 18 for generating a signal indicative of whether the automatic transmission is in "park". Similarly, when transmission 18 is of the manual type, the park switch can be replaced with a speed sensing device for measuring vehicular speed. In either case, ECSA 50 is equipped with means for sensing whether vehicle 10 is operating in a non-motive "zero" speed condition.

Transfer case switch 58 provides a signal indicating whether transfer case 20 is in its two-wheel drive mode or its four-wheel drive mode. An electronic control unit or module 60 is provided to receive the electrical input signals generated from transfer case switch 58, park switch 54 and temperature sensor 52. Control unit 60 has information storage capacity wherein a pre-set maximum value for the fluid temperature confined within front differential 32 is stored as will be hereinafter detailed.

According to the embodiment shown, actuation valve means, such as electrically actuated on-off solenoid valve 62, is provided for selectively actuating a front axle connect mechanism 64 which is provided for selectively coupling and decoupling front wheel assemblies 24 and front differential 32. Solenoid valve 62 controllably actuates axle connect mechanism 64 in response to an output signal generated by control unit 60. An electrical axle switch 66 is also provided in association with axle connect mechanism 64 for generating a signal indicative of whether front axle disconnect mechanism 64 is in its coupled or uncoupled condition. A visual display 67 within the passenger compartment of vehicle 10 is illuminated in response to axle switch 66 to provide the vehicle operator with a visual indication of the operative condition of axle connect mechanism 64.

Figure 2:
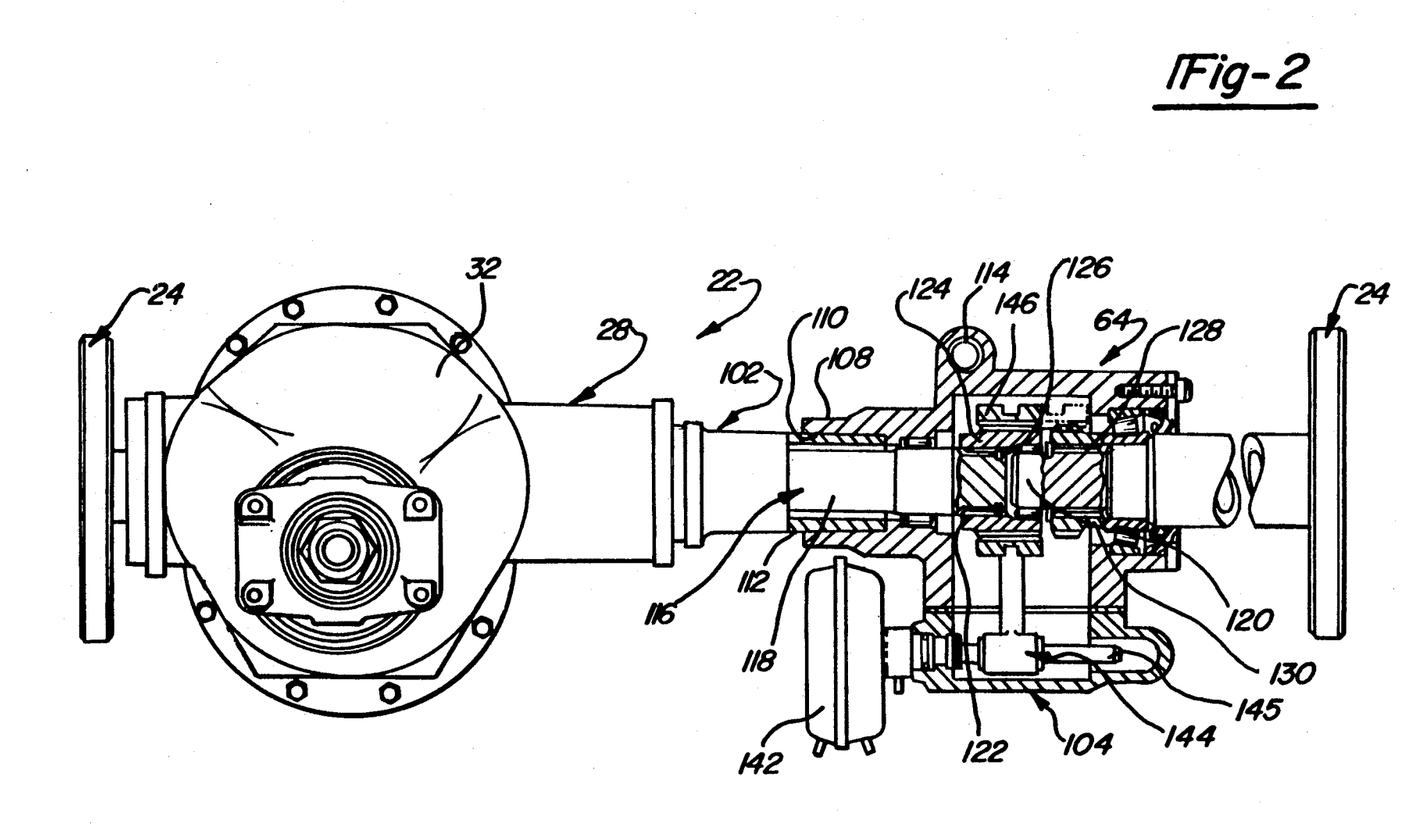
FIG. 2 is a side view, partially broken away, of a portion of a front drive assembly adapted for use in the present invention including the front axle disconnect mechanism.

Referring now to FIG. 2, there is shown a portion of a front drive mechanism 22 which is pertinent to an understanding of the operation of the present invention. However, it is to be understood that front drive mechanism 22 is merely illustrative in nature and is not intended to limit the present invention in any fashion. Front drive mechanism 22 generally includes front axle assembly 28, one or more front axle connect mechanisms 64 and front wheel assemblies 24. Front axle assembly 28 includes a shaft assembly 102 and a housing 104. Housing 104 includes a collar 108 which has an internal opening 110 that receives an axle tube 112. Housing 104 includes a mounting boss 114 for supporting the assembly to a relatively fixed member, for example, the engine block. Alternatively, it can also be practiced with "live" axle systems wherein the axle responds to movement of wheels 24 of vehicle 10. In such systems, housing 104 would be mounted to and form a part of the live axle.

Shaft assembly 102 includes a half-shaft 116 coupled to differential 32 in a conventional fashion having an inner shaft section 118 and an outer shaft section 120. Outer section 120 is physically separated from inner shaft section 118 and attached to wheel assembly 24 in a conventional manner. The outermost end of inner shaft section 118 of axle half-shaft 116 has a slight helical spline 122 formed thereon to avoid backlash from high torque application. A gear 124 is mounted on spline 122 and secured thereto with an internal locking ring 126. Outer shaft section 120 also includes a helical spline 128 at its inner end and which has a gear 130 mounted thereon and which is axially secured thereto.

Front drive mechanism 22 has a first operation (i.e., "uncoupled") mode typically associated with two-wheel drive operation of vehicle 10 wherein inner and outer shaft sections 118 and 120 respectively, of axle half-shaft 116 are not coupled together, but rather are free to rotate independently of one another. In this first operating mode, front wheel assemblies 24 are not coupled to front differential 32. Front drive mechanism 22 also has a second operating mode (i.e., "coupled") wherein inner and outer sections 118 and 120, respectively, of axle half-shaft 116 are coupled or locked together for co-rotation such that wheel assemblies 24 are coupled to transfer case 20 via differential 32 and prop shaft 36. Typically, this second mode of operation is associated with four-wheel drive operation of vehicle 10. More specifically, after transfer case 20 is shifted into its four-wheel drive mode to transfer torque to front differential 32 via front prop shaft 36, front drive mechanism 22 is normally placed in the second mode for transferring the torque from front differential 32 to front wheel assemblies 24.

The exemplary front axle connect mechanism 64 is shown to include a vacuum motor 142 and a shift fork assembly 144 mounted on shaft 145. Vacuum motor 142 is in fluid communication with a vacuum source (not shown) such as the vacuum from the intake manifold of engine 16. Preferably, solenoid valve 62 is a two position valve for opening and closing a communication circuit between the vacuum source and vacuum motor 142. Therefore, shift fork assembly 144, under control of vacuum motor 142, controls the axial shifting of a clutch collar 146 between positions corresponding to its first operating "uncoupled" mode and its second operating "coupled" mode. In the first operating mode, clutch collar 146 is, as shown, in engagement only with gear 124. In this position, shaft sections 118 and 120 are decoupled and differential 32 is disconnected from wheel assemblies 24. In the second operating mode, clutch collar 146 is shifted axially (rightward as indicated in phantom), to engage gears 124 and 130 to cause half-shaft sections 118 and 120 to rotate in common. In this position, differential 32 is capable of transmitting power through connected shaft sections 118 and 120 to wheel assemblies 24.

When the appropriate output signal generated by control unit 60 is applied to control valve 62, solenoid control valve 62 is energized to permit vacuum motor shaft 145 to shift its extended position for causing corresponding shifting of clutch collar 146 to a position corresponding to the second operating "coupled" state.

Under most conditions ECSA 50 is operable to permit the part-time four-wheel drive transfer case 20 to transfer torque between front and rear wheel assemblies 24 and 26, respectively, via the vehicle operator selecting the desired mode of operation in a known manner. More specifically, the vehicle operator manually shifts a transfer case shift lever (not shown) from the two-wheel drive mode into the four-wheel drive mode for selectively transferring drive torque to front differential 32 via front prop shaft 36. Thereafter, axle connect mechanism 64 is normally actuated by solenoid valve 62 to couple front wheel assemblies 24 to front differential 32. As such front wheel assemblies 24 are driven by the drive torque transferred from transfer case 20 through front prop shaft 36 and front differential 32. However, as will be described hereinafter in greater detail, ECSA 50 is operable under certain predefined temperature and operational parameters to selectively and automatically couple front prop shaft 36 with front wheel assemblies 24 for rotation therewith while vehicle 10 is still operating in the two-wheel drive mode.

Operation of ECSA 50 will now be described in greater detail. Assuming the sensors indicate that vehicle 10 is operating in its two-wheel drive mode with the front axle fluid temperature below a predetermined maximum value and vehicle 10 in a "zero" speed condition (i.e., park gear), control unit 60 generates an output signal for selectively and automatically actuating solenoid valve 62 for coupling front wheel assemblies 24 to front differential 32 via axle connect mechanism 64 for rotatably driving prop shaft 36. Since, front prop shaft 36 is interconnected to front differential 32, it rotates with front wheels 12 despite no drive torque being applied thereto from transfer case 20 upon subsequent motive two-wheel drive operation of vehicle 10. Therefore, front prop shaft 36 rotates at a relatively synchronous speed relative to rear prop shaft 38. As noted, under these conditions motor vehicle 10 is still operating in the two-wheel drive mode and front prop shaft 36 is not being driven by transfer case 20.

Thereafter, when the vehicle operator attempts to manually shift transfer case 20 from the two-wheel drive mode into the four-wheel drive mode, the inertial loading associated with from prop shaft 36 and the cold fluid is minimized due to rotation of prop shaft 36 whereby the mechanical synchronizer clutches (not shown but thoroughly discussed in the above-noted U.S. Pat. No. 4,770,280) within transfer case 20 to permit effective speed synchronization for effortlessly shifting transfer case 20 into the four-wheel drive mode.

ECSA 50 is adapted to maintain the coupled interconnection between front differential 32 and front wheel assemblies 24 while vehicle 10 is operating in the two-wheel drive mode until temperature sensor 52 signals control unit 60 that the fluid temperature in front differential 32 has exceeded the upper pre-set temperature limit. Upon the temperature exceeding the upper temperature limit, control unit 60 generates an output signal for actuating solenoid valve 62 for decoupling front differential 32 and, in turn, front prop shaft 36 from front wheel assemblies 24. Thus the pre-set maximum temperature valve stored within control module 60 determines the engagement duration for front drive mechanism 22 during its second operative "coupled" mode. Continued operation of vehicle 10 tends to increase the temperature of the fluid confined in front differential 32 such that the shift effort associated with physically moving the gear shift lever from the two-wheel drive to the four-wheel drive position is minimized due to the corresponding increase in the viscosity of the fluid. Preferably, the upper temperature limit for the fluid is set at about 30° F.

Figure 3:
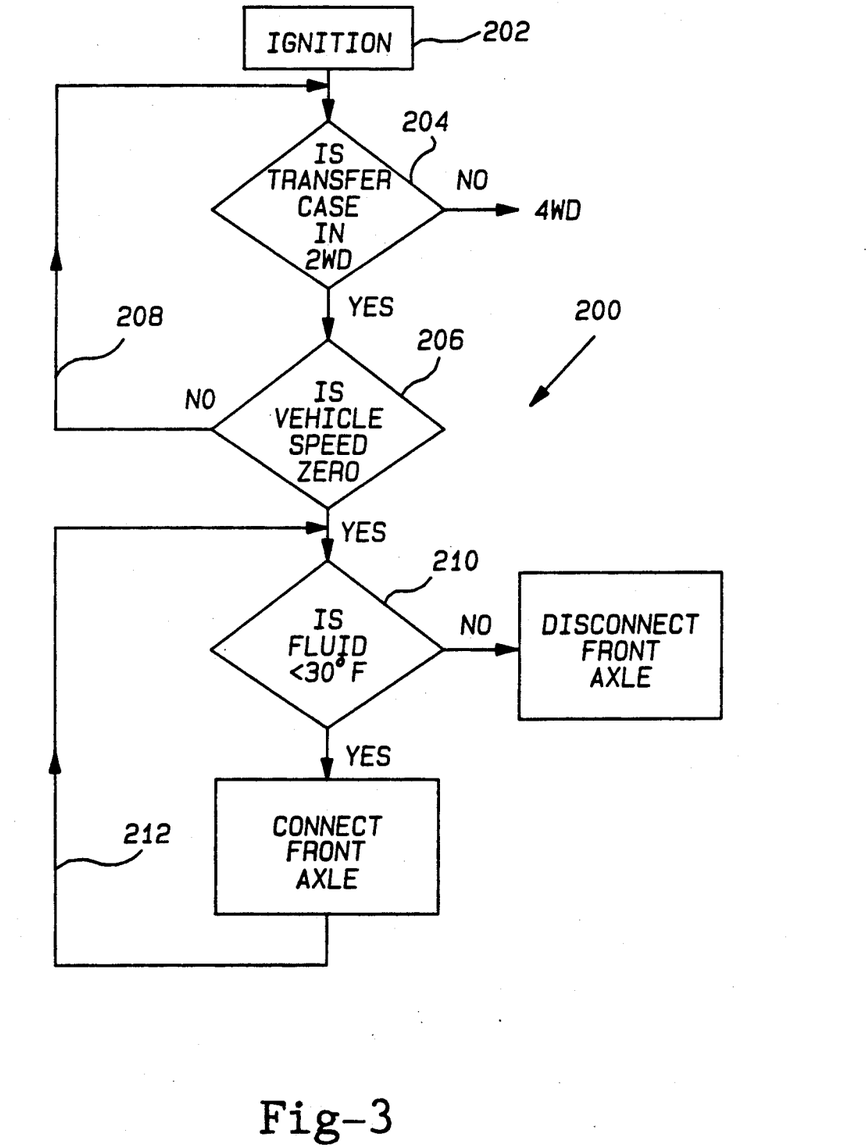
FIG. 3 is a flow chart of the controls associated with selective actuation of the cold shift assist system.

With reference to FIG. 3, a flow chart 200 illustrating a preferred method of operating and controlling ECSA 50 of the present invention is shown. In particular, block 202 indicates an ignition signal sent to control unit 60 in the conventional manner for supplying power thereto. Block 204 represents the determination made by control unit 60 based on the input signal from transfer case switch 58 as to whether transfer case 20 is in the two-wheel drive or four-wheel drive mode. Block 206 represents the determination made by control unit 60 based upon the input signal from park switch 54 which identifies whether transmission 18 is in a "zero" speed condition (i.e., "park"). If vehicle 10 is not in "park", that is, if the vehicle is moving, control unit 60 does not signal solenoid valve 62 to selectively couple the front end drive components. A repetitive circuit 208 is provided for continuously determining the "speed" or motive condition of vehicle 10. If transmission 18 is in park, control unit 60 determines whether the fluid temperature in front differential 32 is less than the pre-set value from the input signal of temperature sensing device 52 as shown in block 210. If the fluid temperature is greater than the maximum limit, ECSA 50 does not actuate solenoid valve 62. However, if the fluid is less than the maximum limit, control unit 60 generates an output signal which is used for actuating electronic solenoid valve 62 for coupling front drive mechanism 22 to front prop shaft 36. A second repetitive circuit 212 is provided for continuously comparing the fluid temperature to the pre-set valve.

As is apparent, the control circuit associated with control module 60 is a repetitive cycle in which the various conditions are repetitively measured and/or determined. Once the fluid temperature within front differential 32 exceeds the predetermined maximum temperature limit, control unit 60 selectively actuates electronic solenoid valve 60 to uncouple the front end components.

The foregoing discussion discloses and describes merely an exemplary embodiment of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A cold shift assist system for a motor vehicle of the type having a source of power for generating drive torque, said shift assist system comprising:

a first axle assembly having first differential means interconnecting a first set of wheels to provide differential action therebetween;

a second axle assembly have second differential means for interconnecting a second set of wheels to provide differential action therebetween;

power transfer means operably coupled to said source of power for normally transferring said drive torque to said first differential means to define a two-wheel drive mode of operation, said power transfer means being operable to permit a vehicle operator to selectively transfer drive torque to said second differential means to define a four-wheel drive mode of operation;

first shaft means interconnecting said power transfer means to said first differential means;

second shaft means interconnecting said power transfer means to said second differential means;

axle connecting means operable for selectively coupling and decoupling said second set of wheels with said second differential means;

switch means for generating a first signal indicative of whether said power transfer means is operating in said two-wheel mode or said four-wheel drive mode;

speed sensing means for sensing whether said vehicle is in a non-motive condition and generating a second signal indicative thereof;

temperature sensing means for sensing the temperature of fluid entrained within said second axle assembly and generating a third signal indicative thereof;

control means for selectively controlling actuation of said axle connecting means in response to said first, second and third signals for normally coupling said second set of wheels to said second differential following said power transfer means being selectively shifted into said four-wheel drive mode, said control means controlling actuation of said axle connecting means for normally decoupling said second set of wheels from said second differential following said power transfer means being shifted out of said four-wheel drive mode, said control means being operable to control actuation of said axle connecting means for selectively coupling said second set of wheels to said second differential prior to said vehicle operator shifting said power transfer means into said four-wheel drive mode when said fluid temperature is below a predetermined maximum value and said vehicle is in a non-motive condition thereby causing said second shaft means to be rotatably driven by said second set of wheels for reducing resistance to said vehicle operator shifting said power transfer means into said four-wheel drive mode, and said control means being operable to actuate said axle connecting means for decoupling said second set of wheels from said second differential prior to said vehicle operator shifting said power transfer means into said four-wheel drive mode when said fluid temperature exceeds said predetermine maximum value.

2. The cold shift assist system of claim 1 wherein said control means includes an electronic control unit adapted to receive said first, second and third signals and for generating an output signal in response thereto, and valve means operable for selectively actuating said axle connecting means in response to said output signal generated by said control unit.

3. The cold shift assist system of claim 2 wherein said electronic control unit includes circuit means for comparing said third signal to said predetermined maximum temperature value to determine if the temperature of said fluid is below or exceeds said maximum temperature valve.

4. The cold shift assist system as defined in claim 2 wherein said second axle assembly includes an axle shaft having a first section coupled to one of said second set of wheels and a second section coupled to said second differential means, said axle connecting means including clutch means associated with said first and second sections and shiftable between first and second positions to respectively couple or decouple said shaft sections, said clutch means being shiftable by said valve means.

5. The cold shift assist system of claim 1 wherein said power transfer means is associated with an automatic transmission such that said speed sensing means is an electrical transmission switch provided to indicate when said vehicle is in said non-motive condition.

6. The cold shift assist system of claim 1 wherein said power transfer means is associated with a manual type transmission such that said second sensor means is a speed speed sensing generating a signal indicative of the motive speed of said vehicle.

7. The cold shift assist system as defined in claim 1 wherein said first axle assembly comprises a rear axle assembly such that said vehicle is normally a rear wheel drive vehicle.

8. The cold shift assist system as defined in claim 1 further including means for sensing whether said axle connecting means is coupled or decoupled, and visual display means locate within said vehicle for providing said vehicle operator with a visual indication of the operative condition of said axle connecting means.

9. A method for reducing operator shift effort upon shifting from a two-wheel drive mode to a four-wheel drive mode under cold weather conditions, said method comprising the steps of:

providing a motor vehicle with a drivetrain having a source of power, a speed gear transmission driven by said source of power, and a transfer case for receiving application of drive torque from said transmission for normally driving a first set of wheels in a two-wheel drive mode of operation, said transfer case being operable to selectively transfer drive torque to a second set of wheels upon being selectively coupled therewith for defining a four-wheel drive mode of operation;

connecting a first drive mechanism between said transfer case and said first set of wheels, said first drive mechanism including axle connecting means for selectively coupling said first set of wheels to a first differential, and a first prop shaft interconnecting said first differential to said transfer case;

connecting a second drive mechanism between said transfer case and said second set of wheels, said second drive mechanism including a second differential interconnecting to said second set of wheels and a second prop shaft interconnectinq said second differential to said transfer case;

sensing if said transfer case is operating in said two-wheel drive mode or said four-wheel drive mode of operation and generating a first signal indicative thereof;

sensing if said vehicle is in a stationary or motive condition and generating a second signal indicative thereof;

sensing the temperature of fluid entrained within said first drive mechanism and generating a third signal indicative thereof;

selectively coupling said first set of wheels to said first drive mechanism via actuation of said axle connecting means while said vehicle is operating in a two-wheel drive mode and when said fluid temperature is below said predetermined maximum value and said vehicle is in a stationary condition whereby said first drive mechanism is rotatably driven by said first set of wheels for reducing resistance to subsequent shifting of said transfer case into said four-wheel drive mode; and selectively decoupling said first set of wheels from said first drive mechanism via actuation of said axle connecting means while said vehicle is operating in said two-wheel drive mode and said fluid temperature is above said predetermined maximum value.

10. In a vehicle having a first set of wheels and a second set of wheels adapted to be driven from a source of power, a cold shift assist system comprising:

transfer case means for receiving application of drive torque from said source of power and selectively transferring said drive torque to said first set of wheels upon selective coupling therewith, and normally transferring torque to said second set of wheels by a normal coupling therewith;

first drive means interconnecting said transfer case means to said first set of wheels;

axle connecting means for selectively coupling said first set of wheels for cooperative engagement with said first drive means;

second drive means interconnecting said transfer case means to said second set of wheels;

switch means for sensing whether said transfer case means is operating in a two-wheel drive or a four-wheel drive mode and generating a first signal indicative thereof;

speed sensing means for sensing whether the vehicle is in a stationary or motive condition and generating a second signal indicative thereof;

temperature sensing means for sensing the temperature of the fluid confined within said first drive means and generating a third signal indicative thereof;

control means for receiving said first, second and third signals and for generating an output signal in response thereto; and actuation means for selectively actuating said axle connecting means in response to said output signal for coupling said first set of wheels to said first drive means prior to a vehicle operator shifting said transfer case means into said four-wheel drive mode when said fluid temperature is below a predetermined maximum value while the vehicle is in a stationary condition whereby said first drive means is rotatably driven by said first set of wheels for reducing resistance to subsequent shifting of said transfer case means into said four-wheel drive mode, and said actuation means selectively actuating said axle connecting means for decoupling said first set of wheels from said first drive means prior to said vehicle operator shifting said transfer case means into said four-wheel drive mode when said fluid temperature is above said predetermined maximum value.

11. The cold shift assist system of claim 10 wherein said control means includes an electronic control unit adapted to receive said first, second and third signals and for generating an output signal in response thereto, and said actuation means is a control valve provided for selectively actuating said axle connecting means in response to said output signal generated by said control unit.

12. The cold shift assist system of claim 11 wherein said electronic control unit includes circuit means for comparing said third signal to said predetermined maximum temperature value to determine if the temperature of said fluid is less than or greater than said maximum temperature value.

13. The cold shift assist system of claim 10 wherein said transfer case means is associated with an automatic transmission such that said speed sensing means is an electrical transmission switch provided to indicate when the vehicle is in said stationary condition.

14. The cold shift assist system of claim 10 wherein said transfer case means is associated with a manual type transmission such that said speed sensing means is a speed sensor generating a signal indicative of the speed of said vehicle.

15. The cold shift assist system as defined in claim 10 wherein said first drive means includes an axle shaft having a first section coupled to one of said first set of wheels and a second section coupled to a first differential unit provided for generating differential action between said first set of wheels, and said axle connecting means including movable clutch means associated with said first and second sections, said actuation means adapted to cause said clutch means to move between first and second positions to respectively couple or decouple said shaft sections.

16. The cold shift assist system as defined in claim 10 wherein said first drive means comprises a front axle assembly such that the vehicle is normally a rear wheel drive vehicle.

17. The cold shift assist system as defined in claim 10 further including means for sensing whether said axle connecting means is coupled or decoupled, and visual display means located within said vehicle for providing said vehicle operator with a visual indication of the operational condition of said axle connecting means.

* * * * *

UNITED STATES PATENT AND TRADEMARK OFFICE
CERTIFICATE OF CORRECTION

PATENT NO. : 5,105,900
DATED : April 21, 1992
INVENTOR(S) : Randy W. Adler, et al It is certified that error appears in the above-indentified patent and that said Letters Patent is hereby corrected as shown below:

Col. 1 line 10, "mote" should be —mode—
      line 55, "complimentary" should be —complementary—
Col. 5 line 16 "haft" should be —half—
Col. 8 line 40, "predetermine" should be "predetermined—
Col. 9 line 3, "second sensor" should be —speed sensing—
      line 13, "locate" should be —located—
      line 4, "speed speed sensing" should be —speed sensor—
      line 41, "interconnectinq" should be —interconnecting—

Signed and Sealed this

Twelfth Day of October, 1993

*Attest:*

BRUCE LEHMAN

*Attesting Officer*      *Commissioner of Patents and Trademarks*